US00RE35449E

United States Patent [19]

Derks

[11] E Patent Number: Re. 35,449

[45] Reissued Date of Patent: Feb. 11, 1997

[54] REMOTE 2-WAY TRANSMISSION AUDIENCE POLLING AND RESPONSE SYSTEM

[75] Inventor: Harry G. Derks, Holland, Mich.

[73] Assignee: Fleetwood Furniture Company, Inc., Holland, Mich.

[21] Appl. No.: 204,653

[22] Filed: Mar. 2, 1994

Related U.S. Patent Documents

Reissue of:

[64] Patent No.: 5,093,786
Issued: Mar. 3, 1992
Appl. No.: 303,163
Filed: Jan. 27, 1989

[51] Int. Cl.[6] ..... G06F 15/80

[52] U.S. Cl. ..... 395/800; 340/825.08

[58] Field of Search ..... 395/800, 200; 364/DIG. 1, 240.9, 241, 227.2, 226.2, 419; 340/825.25, 825.08, 825.69; 455/2, 1, 12, 13; 348/1, 5, 6, 12, 13; 380/46; 434/307 R, 308, 350, 351, 352, 362

[56] References Cited

U.S. PATENT DOCUMENTS

| | | | |
|---|---|---|---|
| 2,352,634 | 7/1944 | Hull | 370/77 |
| 3,245,157 | 4/1966 | Laviana | 434/307 R |
| 3,401,469 | 9/1968 | Shaver et al. | 434/307 R |
| 3,416,243 | 12/1968 | Greenberg et al. | 434/351 |
| 3,445,815 | 5/1969 | Saltzberg et al. | 340/825.14 |
| 3,491,464 | 1/1970 | Gray | 434/350 |
| 3,546,791 | 12/1970 | Koos et al. | 434/323 |
| 3,623,242 | 11/1971 | Hoover | 434/319 |
| 3,676,580 | 7/1972 | Beck | 348/3 |
| 3,676,939 | 7/1972 | Oberst | 434/351 |
| 3,715,510 | 2/1973 | Birnbaum et al. | 370/11 |
| 3,737,858 | 6/1973 | Turner et al. | 340/870.03 |
| 3,757,035 | 9/1973 | Sullivan | 348/1 |
| 3,769,579 | 10/1973 | Harney | 348/4 |
| 3,789,136 | 1/1974 | Haith et al. | 434/323 |
| 3,803,491 | 4/1974 | Osborn | 455/5.1 |
| 3,810,316 | 5/1974 | Lahlou | 434/320 |
| 4,048,729 | 9/1977 | Derks | 434/320 |
| 4,052,798 | 10/1977 | Tomita et al. | 434/307 R |
| 4,057,805 | 11/1977 | Dowling | 340/825.72 |
| 4,076,964 | 2/1978 | Henrion et al. | 370/105.3 |
| 4,107,608 | 8/1978 | Saburi | 370/95.3 |
| 4,107,734 | 8/1978 | Percy et al. | 348/13 |
| 4,238,893 | 12/1980 | Komatsubara | 434/351 |
| 4,290,141 | 7/1981 | Anderson et al. | 455/2 |
| 4,334,319 | 6/1982 | Gurry | 455/227 |
| 4,347,604 | 8/1982 | Saito et al. | 585/458 |
| 4,365,249 | 12/1982 | Tabata | 340/825.3 |

(List continued on next page.)

FOREIGN PATENT DOCUMENTS

| | | |
|---|---|---|
| 1523753 | 8/1967 | United Kingdom . |
| 1078296 | 9/1978 | United Kingdom . |

*Primary Examiner*—Gail O. Hayes
*Assistant Examiner*—Hayward A. Verdun
*Attorney, Agent, or Firm*—Van Dyke, Gardner, Linn & Burkhart, LLP

[57] ABSTRACT

A remote response system includes a central control unit and a plurality of remotely-located response units each having keypads for entering a selection from a user. The central control unit sequentially transmits distinct address words and includes redundant receivers for receiving data words transmitted by response units. Each response unit becomes powered-up upon the entry of a user response and transmits a data word, corresponding to the user selection, upon receipt of its unique address word. The central control unit examines the validity of each data bit received and the validity of an entire data word to determine if both a character and its complement are received. If a valid data word is received, the central control unit transmits an acknowledge bit, which powers-down the response unit that sent the valid word. Each response unit transmits its data word simultaneously with the central control unit transmitting the address word for the next unit that is to respond with the transmissions occurring over distinct frequency channels. A clock signal for controlling data word serial bit transmission is derived at each response unit from the address word signal.

43 Claims, 6 Drawing Sheets

U.S. PATENT DOCUMENTS

| | | | |
|---|---|---|---|
| 4,365,267 | 12/1982 | Tsuda | 348/1 |
| 4,367,485 | 1/1983 | Hemmie | 455/16 |
| 4,377,870 | 3/1983 | Anderson et al. | 455/2 |
| 4,385,314 | 5/1983 | Yashiro | 348/1 |
| 4,392,132 | 7/1983 | Derks | 340/825.14 |
| 4,475,121 | 10/1984 | Yashiro | 348/1 |
| 4,493,655 | 1/1985 | Groff | 434/351 |
| 4,584,602 | 4/1986 | Nakagawa | 379/92 |
| 4,591,906 | 5/1986 | Morales-Garza et al. | 348/13 |
| 4,639,914 | 12/1986 | Winters | 370/110.1 |
| 4,646,145 | 2/1987 | Percy et al. | 348/13 |
| 4,663,744 | 5/1987 | Russel et al. | 367/76 |
| 4,667,193 | 5/1987 | Cotie | 340/825.08 |
| 4,689,619 | 8/1987 | O'Brien, Jr. | 340/825.08 |
| 4,789,983 | 12/1988 | Acamposa | 370/94.1 |
| 4,910,794 | 3/1990 | Mahany | 455/67 |
| 4,918,437 | 4/1990 | Jasinski et al. | 340/825.44 |
| 4,921,464 | 5/1990 | Ito et al. | 455/34.1 |
| 4,926,375 | 5/1990 | Mercer et al. | 364/702 |
| 4,928,099 | 5/1990 | Drake | 340/825.28 |
| 4,937,586 | 6/1990 | Stevens et al. | 343/702 |
| 5,001,755 | 3/1991 | Skret | 380/46 |
| 5,371,858 | 12/1994 | Miller et al. | 395/275 |

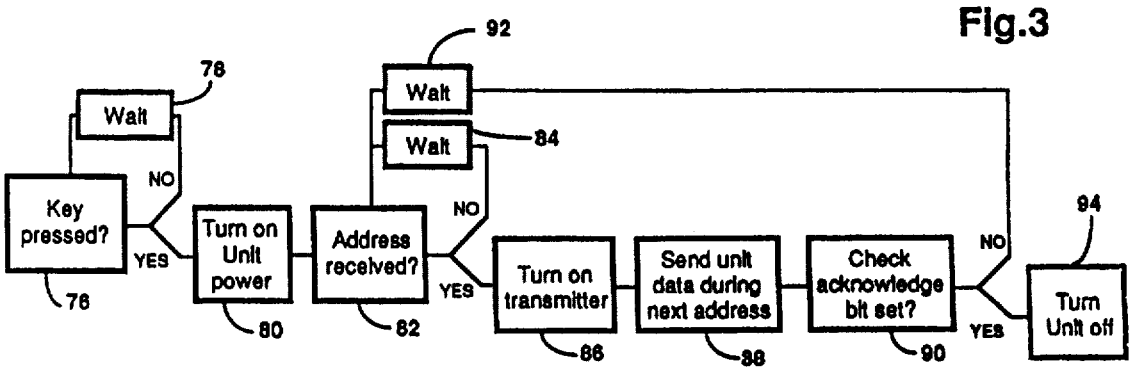
Fig.3
Key pressed?
76
Wait
78
NO
YES
Turn on Unit power
80
Address received?
82
Wait
92
Wait
84
NO
YES
Turn on transmitter
86
Send unit data during next address
88
Check acknowledge bit set?
90
NO
YES
Turn Unit off
94

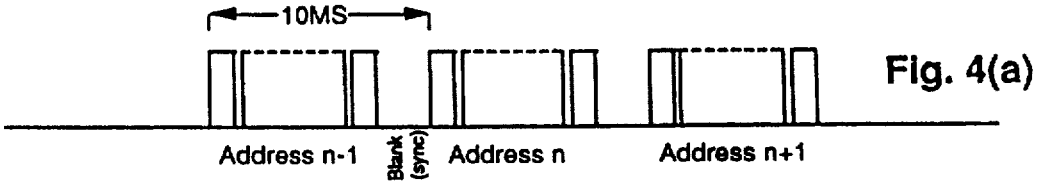
10MS
Fig. 4(a)
Address n-1
Blank (sync)
Address n
Address n+1

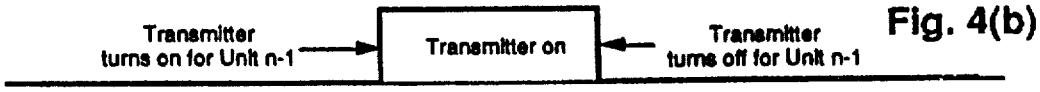
Fig. 4(b)
Transmitter turns on for Unit n-1
Transmitter on
Transmitter turns off for Unit n-1

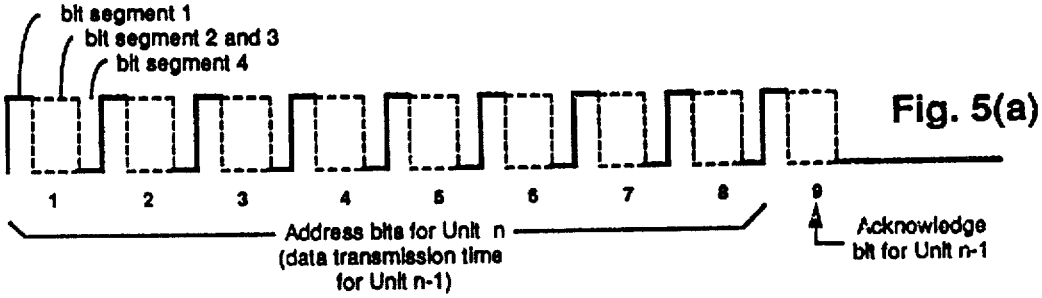
bit segment 1
bit segment 2 and 3
bit segment 4
Fig. 5(a)
1
2
3
4
5
6
7
8
9
Address bits for Unit n
(data transmission time for Unit n-1)
Acknowledge bit for Unit n-1

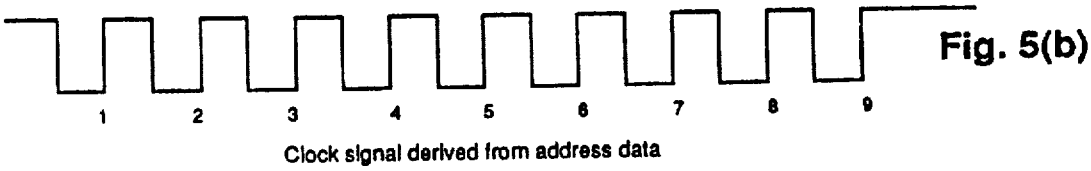
Fig. 5(b)
1
2
3
4
5
6
7
8
9
Clock signal derived from address data

REMOTE 2-WAY TRANSMISSION AUDIENCE POLLING AND RESPONSE SYSTEM

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for a obtaining the individual responses or audience members a to a question put to them, and in particular to such a a method and apparatus including remote units operated by audience members to record a response and a central control unit to retrieve the responses stored in the remote response units. The invention finds application as an educational aid to determine the comprehension level of the pupils in a class, but may additionally be used commercially to conduct audience preference polls and the like.

A long-felt need that has eluded a practical solution is obtaining immediate feedback from audience members to a question put to them. In conducting a lecture, the lecturer may wish to occasionally pose a question to the class to monitor the comprehension level. If the class response indicates a high level of comprehension, then the lecturer may wish to proceed to new material. If comprehension is less than desirable, a review of the subject matter may be appropriate. In another setting, a marketing plan evaluation session may include presenting various options to a test audience and taking an immediate poll of the audience to determine their preferences for various packaging designs, logos, advertisements and the like.

Response systems are of two basic types: hard-wired, in which the remote units are interconnected with the central unit by conductors, and wireless. While the hard-wired systems provide more options for designing the circuitry in a manner to provide rapid collection of the responses, the conductors discourage anything but a permanent installation in a particular room and usually at a high installation cost. The wireless systems provide flexibility in allowing the system to be used in various settings and to be moved at will. However, the fact that wireless systems must communicate over broadcast signals tends to limit the options in system design. The result is that speed of response is compromised, making known wireless response systems unacceptably slow in accumulating the responses, especially if the system includes a large number of remote response units, such as 250.

In one known wireless response system, a central control unit transmits a signal simultaneously to all response units. Each response unit responds to the signal by returning a response after a predetermined time delay unique to the particular response unit. The central unit receives and records the responses. The problem with such a system is that sufficient dead space must be provided between response intervals to accommodate drift in the operation or the response units. In another known wireless remote system, the central unit transmits an address word to all response units and receives a reply from the response unit to which the particular address word is assigned. After the reply is received, the next address word is transmitted. Such units are also unacceptably slow because the central unit must wait to receive a response after transmitting an address word before transmitting the following address word. Additionally, the data transmission rate must be kept relatively slow because the central unit and the response units all operate from individual clock sources, which are subject to drift and require close tolerance components. Other difficulties experienced in such prior wireless systems include susceptibility to erroneous data and inherent complexity in the central unit software design if it is desired to test data word validity and to retry a unit whose response is not valid. Further, practical difficulties may arise in isolating problems that may occur in setting up a system, especially by a nontechnical person.

SUMMARY OF THE INVENTION

Accordingly, it is an object of the present invention to provide a remote response system that provides extremely rapid accumulation of responses in a remote response system while testing the responses such that only valid responses are accepted. A remote response system according to one aspect of the invention includes a central control unit including a transmitter for sequentially transmitting a plurality of distinct address words to remotely located response units and a receiver for receiving data words transmitted from response units. Each response unit includes user-operable data entry means and a receiver for receiving address words transmitted from the central control unit. Each response unit further includes circuit means for identifying an address word unique to the particular remote unit and a transmitter for transmitting data to the central control unit in response to identification of its unique address word. The central control unit also includes means for determining that a valid data word has been received from a response unit and for transmitting to the response unit sending the valid word an acknowledge message.

According to another aspect or the invention, each response unit switches to a first "on" mode when a selection is entered by a user and transmits a corresponding data word in an interval immediately after receipt of its unique address word. An acknowledge message transmitted from the central control unit in response to receiving a valid data word places the particular response unit into a second, or "off," mode. Once a response unit is placed in the "off" mode, it will not respond to its address word again until a new user selection is made. However, a particular response unit in the "on" mode will continue to transmit its data word in response to its address until it is placed in the "off" mode by receipt of the acknowledge message.

According to another aspect of the invention, each remote response unit includes a clock generator that determines the timing of data transmission from the response unit to the central control unit. The clock generator responds to the received address words and generates a clock signal synchronized with elements of the address words. This provides synchronization of all response units with the clock of the central unit to provide precise timing to facilitate transmission of data words in a much shorter time interval. These and other related objects, advantages and features of this invention will become apparent upon review of the following specification in conjunction with the drawings.

BRIEF DESCRIPTION OF THE DRAWINGS

FIG. 3 is a logic flow diagram of a response unit;

FIGS. 4a and 4b are signal diagrams illustrating the sequential transmission of address words and the change in mode of a particular response unit;

FIGS. 5a and 5b are signal diagrams of a demodulated address word signal and a clock signal derived therefrom:

DESCRIPTION OF THE PREFERRED EMBODIMENT

Figure 1:
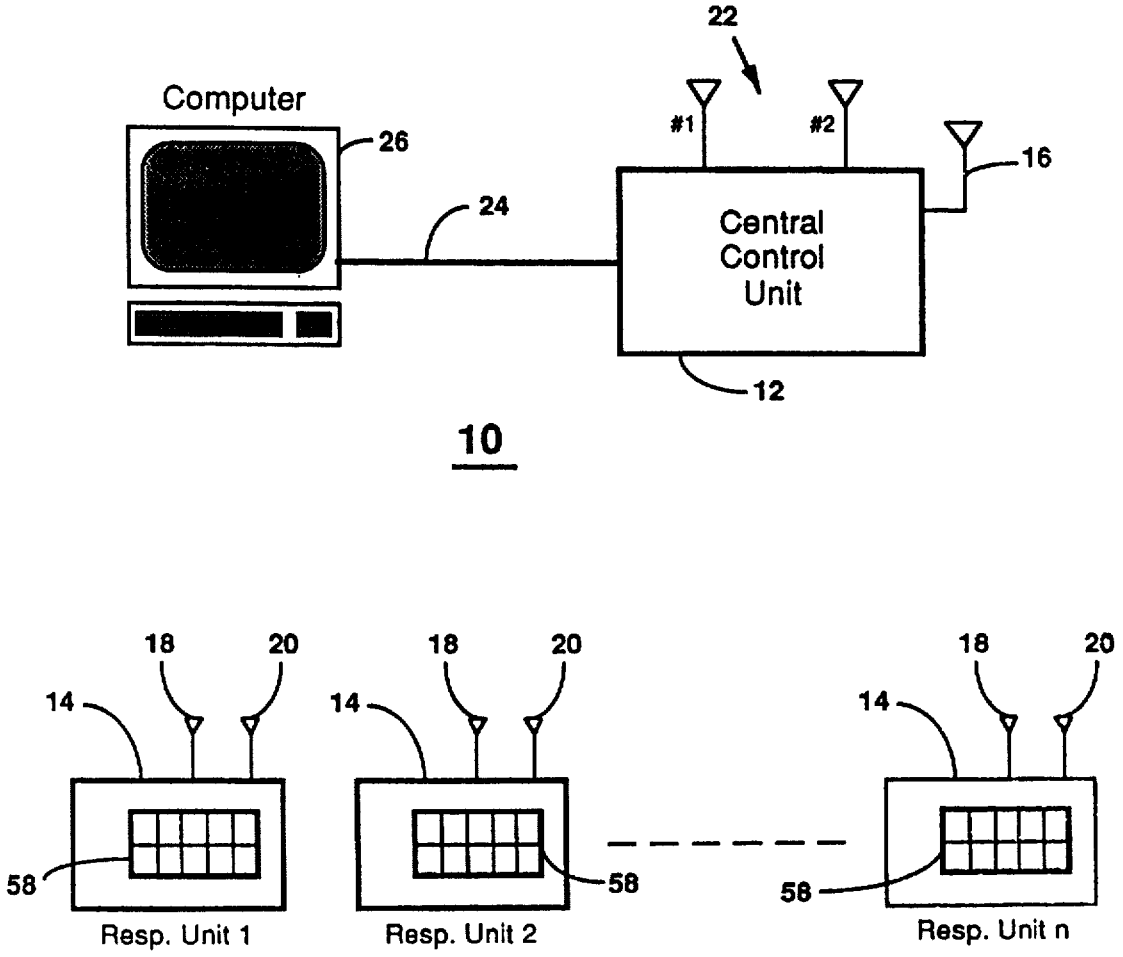
FIG. 1 is a diagram of a remote response system according to the invention.

Referring now specifically to the drawings, and the illustrated embodiments depicted therein, a remote response system 10 includes a central control unit 12 and a plurality of response units 14 located remotely from central control unit 12 (FIG. 1). Central control unit 12 includes an address transmitting means 16 for broadcasting an RF signal modulated with address words. The signal transmitted by the central control unit is received by receiving means 18 for each response unit 14. Each response unit further includes data transmitting means 20 for transmitting an RF signal modulated with data words. The signals transmitted by transmitting means 20 are received by receiving means 22 at central control unit 12. Central control unit 12 may be connected by a serial data link 24 with another piece of equipment, such as computer 26, to further process data words provided from central control unit 12.

Figure 2:
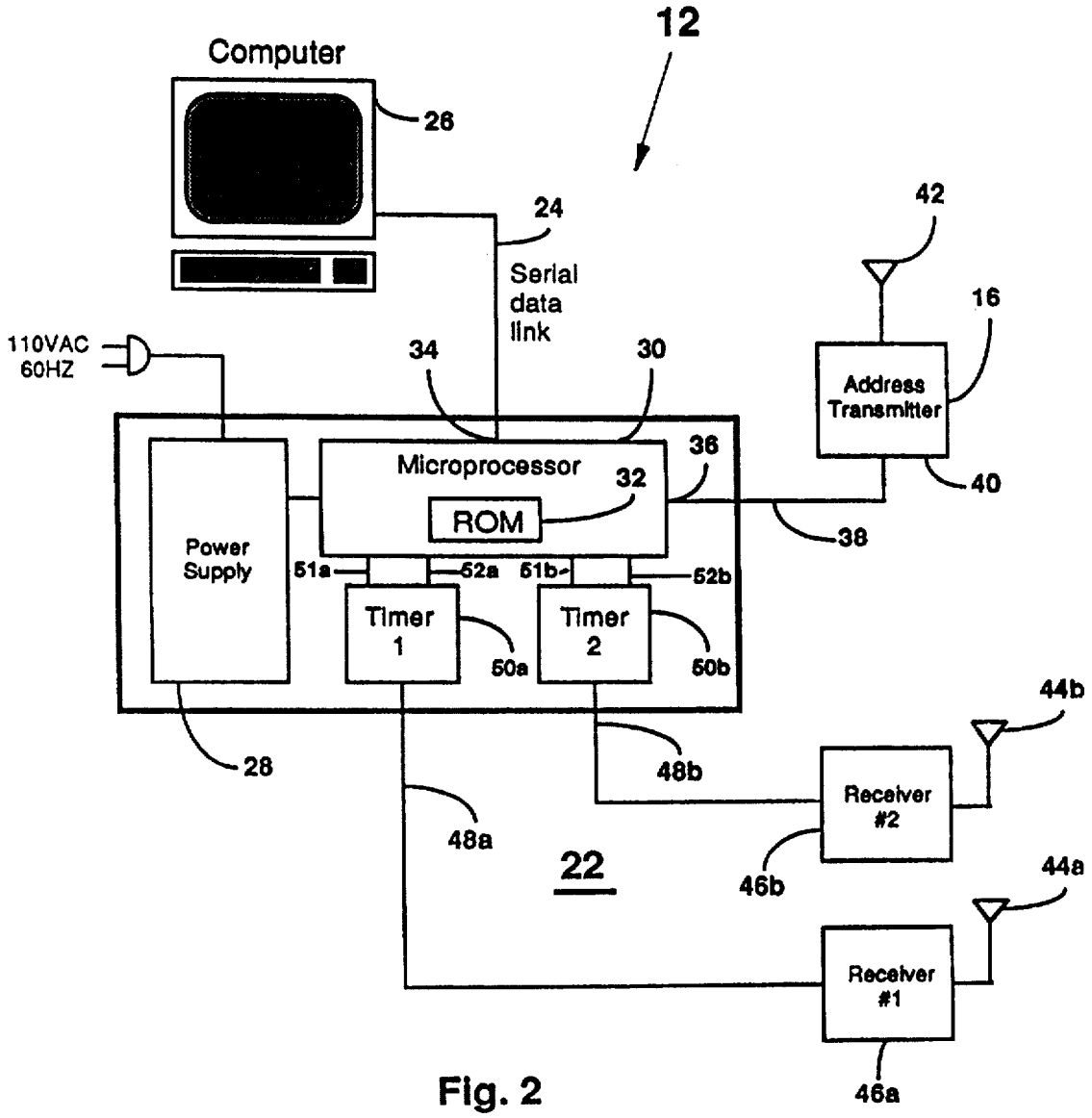
FIG. 2 is an electrical circuit diagram of a central control unit in block form.

Central control unit 12 includes a conventional power supply 28 and an eight-bit microprocessor 30 including a read-only memory 32 and a first output port 34 connected through a line 24 to computer 26 (FIG. 2). In the illustrated embodiment, microprocessor 30 is an Intel 8085 circuit, output port 34 is a conventional RS232 serial data channel and computer 26 is a personal type computer utilizing a high level language operating system such as UNIX or DOS. A second output port 36 of microprocessor 30 provides a digital keying interface with transmitting means 16 through a line 38. Transmitting means 16 includes a transmitter 40 and a vertical antenna 42. Transmitter 40 is frequency-shift-keyed (FSK) in response to the digital state of output port 36. Receiving means 22 of the central control unit include a pair of antennae 44a and 44b connected respectively with receivers 46a and 46b. Receivers 46a. 46b are superheterodyne receivers producing 10 KHz/20 KHz detected information output signals on lines 48a and 48b, respectively. The output signals from the receivers will have a discrete frequency of either 10 or 20 KHz depending upon the bit value of the data word being received through receiving means 22. The receiver output signals are decoded by timers 50a and 5Ob, which are started and stopped by microprocessor 30 through control buses 51a and 51b in order to count cycles of the signals on lines 48a and 48b for a predetermined fixed interval. The decoded data words outputs of timers 50a and 50b are provided to input buses 52a and 52b of microprocessor 30.

Receivers 46a, 46b are tuned to a different frequency than that of transmitter 40. In the illustrated embodiment, transmitter 40 transmits at 216 MHz and receivers 46a, 46b are tuned to 340 MHz, which is the frequency of transmission from the remote units 14. This provides separate transmitting and receiving channels to allow the remote units to transmit data words to the central control unit simultaneously with the central control unit transmitting address words to the response units. The purpose of providing a pair of receivers 46a and 46b is for redundancy in receiving means 22 at the central control unit. Thus, even if a particular response unit 14 is positioned within a room in a blind spot with respect to one antenna 44a, 44b, it most likely will not be in the blind spot of the other antenna. In this manner, central control unit 12 has enhanced capability for receiving signals from all response units. Transmitter 40 transmits at a relatively high power output, such as 100 milliwatts, and therefore is capable of broadcasting throughout an entire room, including an auditorium, without producing blind spots. Therefore, no redundant address transmitter is required for transmitting means 16.

Read-only memory 32 provides a store for unique eight-bit address words for all response units 14 in system 10. The software that operates microprocessor 34 retrieves the individual address words from ROM 32 and sequentially serially transmits the address words on key line 38 to transmitter 40, where the signal broadcast from antenna 42 is FSK modulated by the particular address word. Microprocessor 30 continues to repetitively cycle through the address words on a continuous repetitive basis whenever central control unit 12 is in operation. Data words received by antennae 44a, 44b are demodulated by receivers 46a, 46b, decoded by timers 50a, 50b and provided at inputs 52a and 52b to microprocessor 30. After verifying their validity, microprocessor 30 immediately transmits the data words as serial data from output port 34 over line 24 to computer 26 where the responses are received and analyzed.

Figure 6:
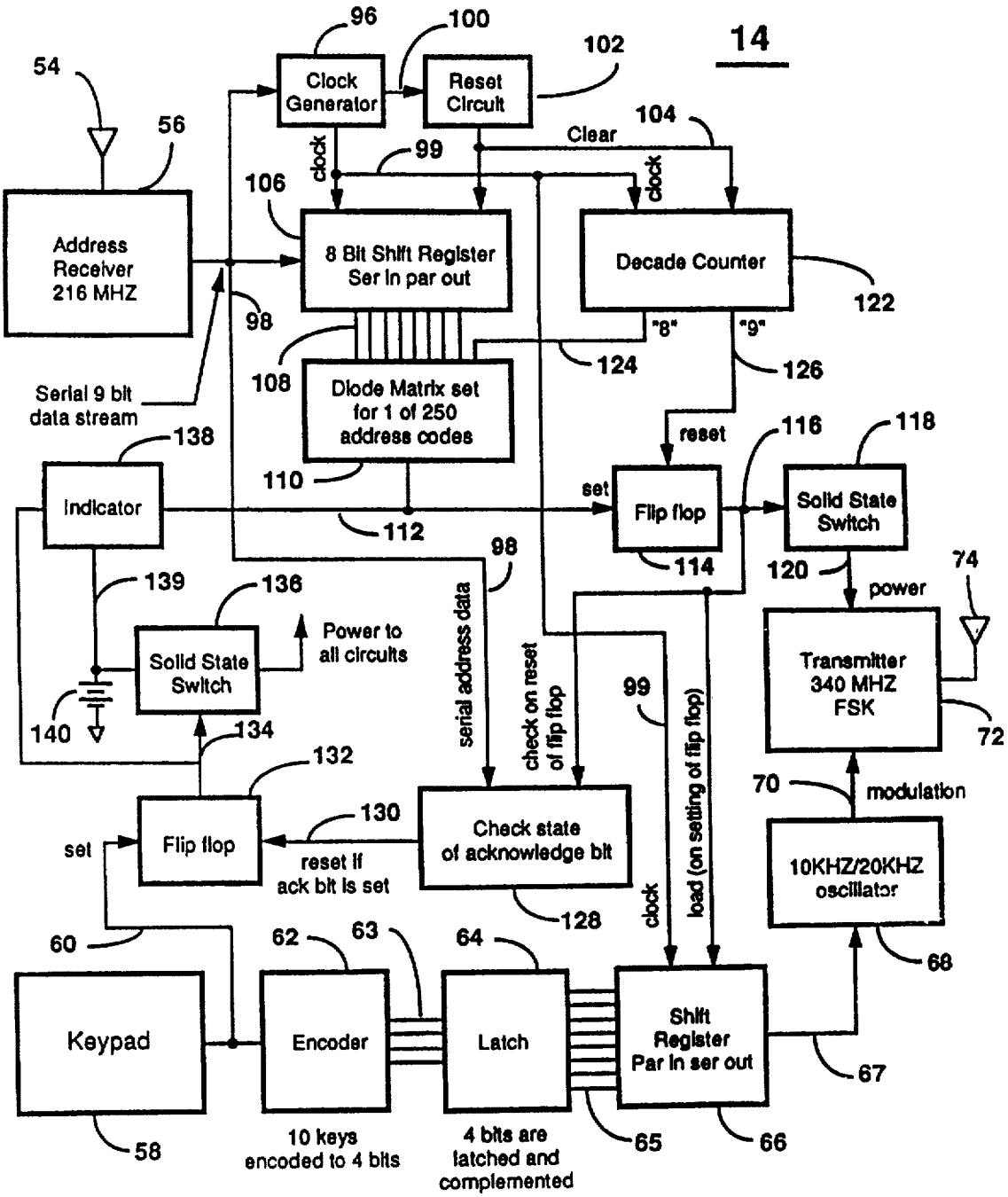
FIG. 6 is an electrical circuit diagram of a response unit in block form.

Receiving means 18 for each response unit 14 includes a receiving antenna 54 connected with a receiver 56 tuned to the frequency of address transmitter 40, which in the illustrated embodiment, is 216 MHz (FIG. 6). Response unit 14 additionally includes user-operable data entry means such as a keypad 58 which, in the illustrated embodiment, provides 10 user-selectable input keys to provide the capability of receiving a one-out-of-ten selection response from the user. An output 60 from keypad 58 is provided to a decade to binary encoder 62 for conversion to four-bit binary data, which is provided in parallel on lines 63 to a latch 64. Latch 64 receives four parallel data lines 63 and produces eight channels of parallel data on line 65. The eight parallel data lines 65 represent the four bits inputted on line 63 plus the complement of the four-bit data word on line 63. The parallel outputs of latch 64 are provided on lines 65 to a parallel in/serial out shift register 66 which converts the parallel data to a serial data stream on line 67, which is provided as an input to a 10 KHz/20 KHz oscillator 68. The timing of data conversion in shift register 66 is controlled by a clock line 99. Output 70 of oscillator 68 is a subcarrier signal modulated to either 10 KHz or 20 KHz depending on the binary state of data line 67. The 10 KHz/20 KHz subcarrier signal on line 70 is utilized to FSK modulate a 340 MHz signal in transmitter 72, whose output is broadcast on a loop antenna 74 to the central control unit.

Operation of the remote response unit 14 is illustrated in FIG. 3. The control logic determines at 76 whether the user has pressed a key of keypad 58 to enter a response in unit 14. If control determines that a key is not pressed, then it cycles through a waiting loop 78. When it is determined at 76 that a key has been pressed, power to the response unit circuitry is applied at 80. Control then passes to block 82 where it is determined whether the address unique to the particular response unit has been received from central control unit 12. If not, control cycles through a loop 84 until the unique address is received. When it is determined at 82 that the unique address word has been received, control then passes to a block 86 where the control logic in unit 14 energizes transmitter 72. With transmitter 72 energized, the unit transmits at 88 the data word entered through keypad 58 during the interval in time that the central control unit 12 is sending the next address, which is unique to a different response unit 14. When the central control unit receives the data word from the transmitting response unit, the data word is examined to determine if it corresponds to a valid data word. If it does, then the central control unit responds by sending an acknowledge bit during the ninth bit interval of the address word that is then being transmitted. The response unit logic checks at 90 whether an acknowledge bit has been received from the central control unit. If not, control passes back to block 82 through a loop 92, where the response unit waits for its unique address word to again be transmitted by central control unit 12 at which time the transmitter is turned on (86), the data word is again transmitted (88) and the acknowledge bit is again checked (90). This is repeated until an acknowledge bit is received and control passes to 94 wherein the response unit 14 turns itself off.

Thus, the response unit responds to a user entering a selection on keypad 58 by switching to a first mode, in which power is applied to the response unit circuits and the data word corresponding to the selected key is transmitted to the central control unit in response to the central control unit transmitting the address word unique to that particular response unit. If the central unit returns an acknowledge bit, after the address of the unit that will subsequently respond, the transmitting response unit returns to a second mode in which it is deenergized, or off. Central control unit 12 sequentially transmits the addresses for all response units 14 in one cycle and then repeats the same cycle over and over again irrespective of the responses received from the response units 14. Therefore, if the central control unit does not send an acknowledge bit, the corresponding response unit will again transmit its data word during the next address cycle.

FIGS. 4a and 4b illustrate the time relationship between the address words transmitted by central control unit 12 and the response of the corresponding response unit. In the illustrated embodiment, address word n—1 includes eight bits. When the eighth bit has been transmitted, response unit n—1 identifies the address word as its unique address and energizes its transmitter, after a slight delay, after the eighth bit is received. After a blanking period, during which the logic circuits of response unit n—1 are reset, the data word from response unit n—1 is transmitted in serial fashion to the central control unit. The eight bits of the data word from unit n—1 are transmitted to the central control unit in synchronism with central control unit transmitting the eight bits that comprise the address word for response unit n. After the eighth bit of address word n and data word n—1 are transmitted, and in the interval before the ninth bit, central control unit 12 examines the content of the data word received from box n—1 and makes a determination if a valid data word has been received. If so, the central control unit transmits an acknowledge bit as the ninth bit in address n. However, the acknowledge bit is sent with respect to response unit n—1, which responds to receipt of the acknowledge bit by switching itself to a second mode in which it is powered down. If the transmitter does not receive a valid data word and declines to send an acknowledge bit, transmitter n—1 ceases to transmit but remains in an "on" mode ready to retransmit the data word during the next cycle of address transmissions. Once the acknowledge bit is received upon successful transmission of the data word, the corresponding response unit remains powered down until the user again makes a selection on keypad 58.

A typical address word with acknowledge bit is illustrated in FIG. 5a as including nine bits. Each bit is divided into four-bit segments with the first bit segment always in a high state (or 1) and the fourth bit segment always in a low state (or 0). Segments two and three are high if that particular bit is to be a 1 and low if that particular bit is to be a 0. This particular pulse width modulation scheme is advantageous in that it allows the response units 14 to generate a clock directly from the address word signal resulting in the waveform illustrated in FIG. 5b. This is accomplished by a clock generator 96 responding to the leading edge of each positive going pulse in the address word signal by triggering a one-shot multivibrator, which has a time duration nominally set for one-half of the pulse repetition rate of the address word signal. This provides a fairly symmetrical clock signal, as illustrated in FIG. 5b, which is in synchronism with the transmission of the address word bits, or elements, from the central control unit 12.

The derived clock signal is utilized in the remote unit to gate the data word bits to the response unit transmitter 72. Therefore, data transmission between the central control unit and all of the response units is synchronous from a single clock source that is established at the central control unit. This synchronous transmission provides reliable transmission in a narrower interval which provides more rapid communication between the units. In the illustrated example, each bit segment is 0.2 milliseconds. Therefore, each bit interval is 0.8 milliseconds and an entire address word interval, including the blanking interval, is 10 milliseconds. Because the response from a particular response unit is transmitted back to the central control unit during the same 10 millisecond interval that the central control unit is sending the address word for the next response unit, an entire address/response cycle occurs in 10 milliseconds. Therefore, with a system including 250 response units 14, it requires only 2.5 seconds to poll all of the response units and obtain responses from the units.

The continuous RF signal modulated with address words by central control unit 12 is received at each response unit 14 by antenna 54 and demodulated by receiver 56 (FIG. 6). The demodulated address word signal, which is in serial digital form, is provided on line 98 to clock generator 96, which produces a clock signal on line 99 of the form illustrated in FIG. 5b and as previously described. Another clock signal output of clock generator 96 is presented on line 100 to a reset circuit 102. Because of the 3.2 millisecond blanking period between address words, a pause in the clock signal occurs every nine cycles. Reset circuit 102 responds to this pause by producing a clear signal on a line 104 between address words to reset the logic circuits in response unit 14. The address word signal from line 98 is additionally provided as an input to an eight-bit shift register 106 which stores each eight-bit serial address word and presents it in parallel on output lines 108. Output lines 108 are presented to a diode matrix decoder 110, which is uniquely set for each response unit 14 and produces a pulse on an output line 112 in response to the unique combination of lines 108 that correspond to the particular response unit. A detailed explanation of a diode matrix decoder is provided in U.S. Pat. No. 4,048,729, issued to the present Applicant, assigned to the Assignee of the present application and which is incorporated herein by reference. Decoder 110 could alternatively be implemented by a PROM circuit, DIP switch or other equivalent means.

A latch 132 is set from line 60 upon receipt of a user input on keypad 58. Latch 132 provides an output on a line 134 to actuate a solid state switch 136 that controls the power to essentially all of the circuits in unit 14. Thus, latch 132 is set upon the user making a selection on keypad 58 to power-up the entire response unit 14, including applying power to a solid state switch 118. The output From decoder 110 is presented on a line 112 which is connected with the set terminal of a latch, or flip-flop, 114. The output of flip-flop 114 is presented on line 116 as a gating input to solid state switch 118. Switch 118 is interconnected with transmitter 72 by line 120 and provides power to the transmitter whenever latch 114 is set by a pulse on line 112, in response to decoder 110 determining that the address word in shift register 106 is the address word unique to the particular unit 14, provided that latch 132 is also set so that the response unit is in an "on," or powered-up, mode. A decade counter 122 counts clock pulses on line 99 and is cleared by output line 104 from reset circuit 102. Counter 122 produces a pulse on an "8" line 124 simultaneous with the eighth bit of each address word and a pulse on "9" line 126 simultaneous with the ninth bit of the address word. Line 124 is provided as an enabling line to decoder 110 to cause the decoder to examine lines 108 and produce an output on line 112 if the unique address word is present after the eight bits have been clocked into the shift register. A slight delay built into decoder 110 prevents line 112 from setting latch 114 until after the ninth pulse of the address word for that particular unit has been received. The output on line 126 will reset latch 114 and power-down transmitter 72 at the end of the ninth bit of the subsequent address word. Thus, transmitter 72 is energized upon receipt of the address word that is unique to the particular unit provided the response unit is in an "on" mode and is deenergized upon the ninth bit of the subsequent address word.

Line 126 from decade counter 122 is additionally presented to an acknowledge bit check circuit 128. Circuit 128 additionally receives the serial address word signal on line 98 and produces a change of state on its output presented to line 130 if line 98 is producing a "1" bit when line 116 changes state during the ninth bit. This indicates that an acknowledge bit has been sent from the central control unit immediately in response to the transmitting of a valid data word from the particular unit 14. Line 130 is presented to the reset terminal of latch 132 to reset the latch and deenergize switch 136. Thus, when an acknowledge bit is received, power is removed from all circuits of response unit 14 which places that unit in an "off" or powered-down mode until another entry is made by the user on keypad 58.

The change in the output of latch 114 on line 116, in response to a pulse on set input line 112, enables shift register 66, which receives the clock signal from line 99, to serially shift out the character and its complement received from latch circuit 64 which corresponds to the user selection. The bits of the serial data word produced on line 67 are modulated with a subcarrier by oscillator 68 to produce a signal on line 70 which frequency-shift key modulates transmitter 72, which transmits a signal from antenna 74 to the central control unit. IF the central control unit determines, after testing the eight bits for validity, that the transmitted data word is valid, the central control unit immediately sets the acknowledge bit as the ninth bit, which causes check circuit 128 to reset latch 132, which switches solid state switch 136 "off" to power-down all of the circuits of unit 14.

Output line 134 from latch 132 is additionally presented as the set input to a latching indicator 138 which produces an indication, such as a visual signal, to the user when latched. The reset terminal of latching indicator 136 is connected with line 112. Thus, whenever the user makes a selection on keypad 58, indicator 136 is latched on by line 134 and remains on until the unit's unique data word is decoded, which produces a pulse on line 112. If unit 14 transmits a data word which is validly received at central control unit, then indicator 136 goes off and remains off because flip-flop 132 resets its output 134. If, however, the central control unit does not receive a valid data word from unit 14, latch 132 will stay latched, which will cause indicator 136 to be reenergized as soon as the reset pulse from line 112 is removed. Indicator 136 provides a useful visual feedback to both the user and to a technician attempting to diagnose a fault in system 10. If indicator 136 comes on when keypad 58 is stroked and goes off soon thereafter, then the data has been successfully transmitted to the central unit. If indicator 136 winks off after being on but again goes on, the unique address word for that particular response unit is being received but the data word sent out in response thereto is not being validly received at the central unit. If indicator 136 comes on and stays on continuously, then the address word unique to the particular response unit is not being received by that unit. A fine 139 is shown extending from a battery 140 to indicator 136 to illustrate that indicator 136 may additionally be utilized as a low voltage indicator that may indicate a worn battery by rapid switching itself on and off.

Figure 7:
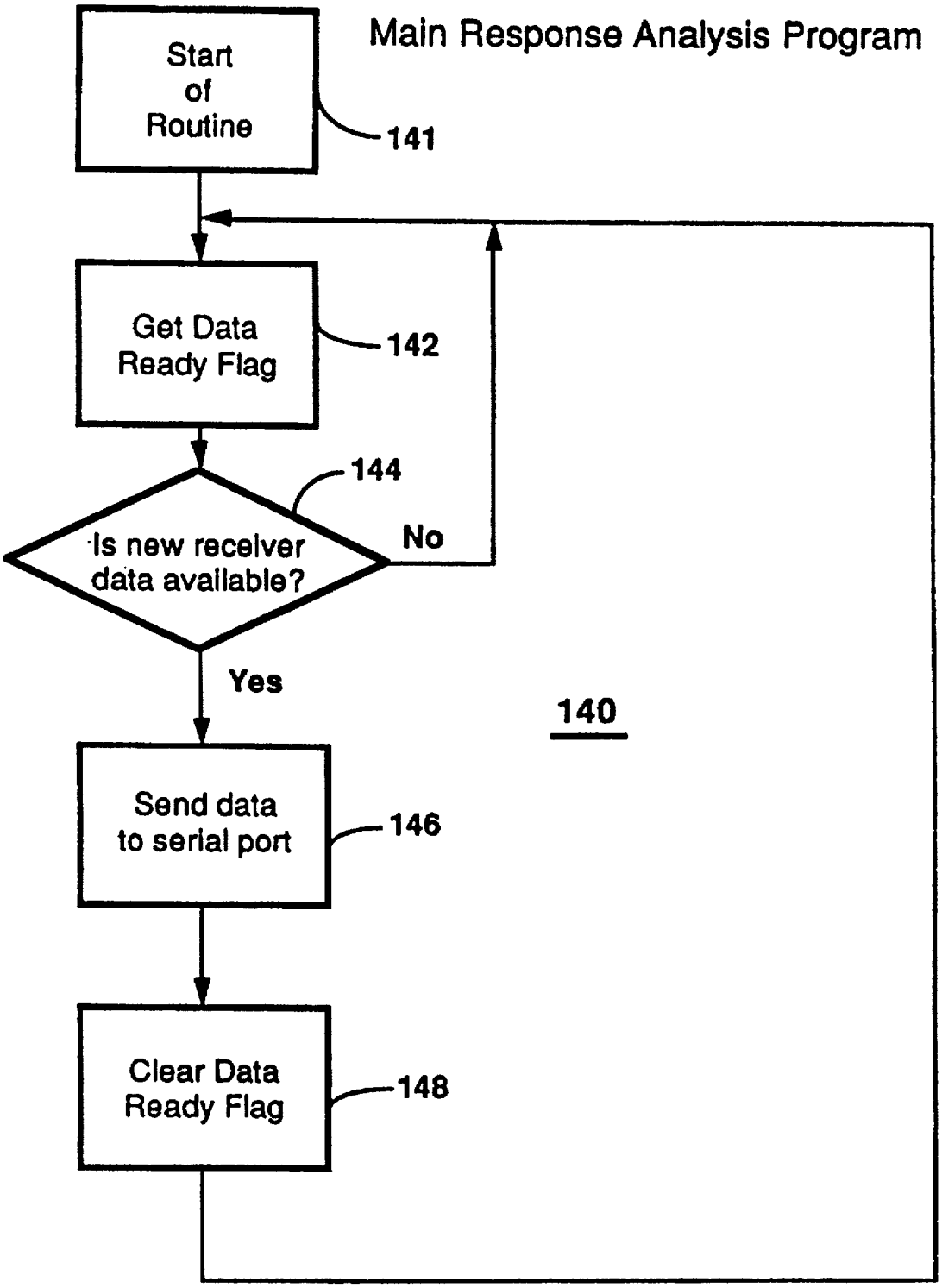
FIG. 7 is a logic flow diagram of the central control unit main software program.

Microprocessor 30 of central control unit 12 is provided with a primary software routine 140 (FIG. 7) that, after being initialized at 141, retrieves the contents of a data ready flag register at 142. The status of the data ready flag is examined at 144 to determine if the flag is set to indicate that a valid data word is available at a particular memory address in microprocessor 30. If not, the program returns to block 142 to continue looking for the data ready flag. Once it is determined at 144 that the data flag has been set, control passes to block 146 where the valid data word is retrieved from memory and outputted from port 34 to computer 26. Control then passes to block 148 where the data ready flag is cleared and to block 142 to await the data word from the next response unit.

Figure 8:
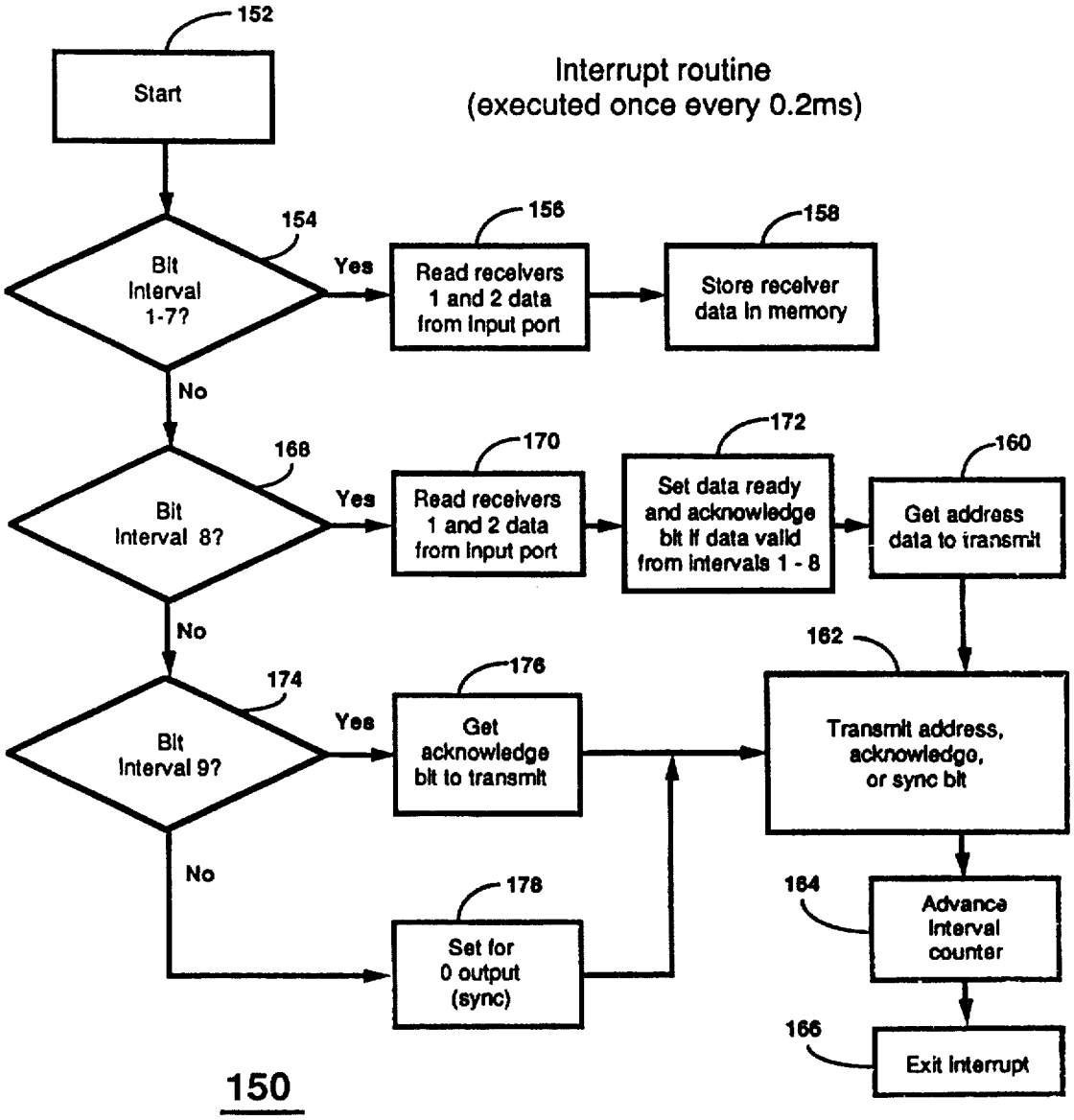
FIG. 8 is a logic flow diagram of an interrupt routine in the central control unit software program.

A software interrupt routine 150 is executed by microprocessor 30 at a predetermined rate by exiting primary routine 140 at predetermined intervals and returning to the point of interruption (FIG. 8). In the illustrated embodiment, the interrupt routine is repetitively carried out every 0.2 milliseconds, which corresponds with the length of each of the four segments that define one bit in both the address words and the data words. Every four passes through the interrupt routine, one bit of the address word or the acknowledge bit will be transmitted (except during the blanking interval during which only 0's are transmitted) and one bit of a data word will be received, decoded and initially checked for validity. During the fourth pass in the eighth bit interval, the entire data word received by the central control unit will be finally tested for validity.

The interrupt routine 150 is initiated from the main program at 152 every 0.2 milliseconds. Control passes to block 154 where it is determined from an interval counter whether the bit segment that is to be transmitted/received falls within the first seven bits of the address word/data word or the first three bit segments of the eighth bit interval. If so, control passes to block 156 where the microprocessor 30 reads the value of the bit segment on buses 52a and 52b. This is accomplished by the microprocessor operation timer 1 (50a) from an output bus 51a for a predetermined period of time and operating timer 2 (50b) from an output bus 51b for the same predetermined period. The number of cycles on lines 48a and 48b are counted by the respective timer during the predetermined period. At block 156, the microprocessor examines bus 52a to determine the number of counts measured by timer 1. If the number falls within a first predetermined range, corresponding to a 10 KHz subcarrier on line 48a, the bit segment is interpreted as a 0 and if the number of cycles falls within a second predetermined range, corresponding to a 20 KHz subcarrier frequency, the bit segment is interpreted as a 1. Thus, not only is the bit segment transmitted by the response unit received and decoded, an initial validity check is performed by requiring that the cycles produced within a predetermined period fall precisely within one of two predetermined ranges. If a valid bit segment is not received from timer 1, the microprocessor examines the output from timer 2 on bus 52b to determine in the same manner if a valid bit segment has been received.

Control then passes to block 158 where the validly received bit segment is stored at the address within microprocessor 30 indicated by a memory pointer. The pointer is then advanced for receipt of the next bit segment. Control then passes to block 160 where the value of the address word bit segment to be transmitted during the interrupt routine is retrieved from ROM 32 and to block 162 where the bit segment is transmitted by transmitting means 16. Control then passes to block 164 where the bit segment and interval counter is advanced one count and control is returned at 166 to the portion of main program 140 where it exited for the interrupt routine.

If it is determined in block 154, upon examining the interval counter, that the program is not presently within one of the first seven bit intervals or within one of the first three bit segments of the eighth bit interval, control passes to block 168 where it is determined whether the fourth segment of the eighth bit of the address word/data word is being transmitted/received. If so, control passes to block 170, where the bit segment received by receivers 46a and 46b is decoded and an initial validity check of the segment is performed in the same manner as previously set forth with respect to block 156. Additionally, the control further examines the content of the memory address at which the received data word is retained to determine if an entire eight-bit data word has been validly received and, if so, that the data word includes both a character and its complement. If so, control passes to block 172 where the data ready and acknowledge bit flags are set. Control then passes to blocks 160 through 166, where the final address word bit segment is transmitted and control is returned to the main program.

If it is determined in blocks 154 and 168 that the program is not within bit intervals one through seven, or eight, then control passes to block 174 where it is determined from examination of the interval counter whether the control is in bit interval nine. If so, control passes to block 176 where the acknowledge flag that is either set or not set in block 172 is examined and the appropriate value of the acknowledge bit segment is obtained. Control then passes to block 162 for transmission of the acknowledge bit segment and to blocks 164 and 166 for advancement of the internal counter and exiting of the interrupt routine. During the ninth bit interval, no data will be received from a response unit because the data word is transmitted during the first eight bits with the ninth bit interval devoted to sending of the acknowledgment bit. If it is determined that the program is not within the first nine bit intervals (154, 168, 174), then the program sequence must be within a blanking interval. Control passes to block 178 where an 0 bit segment is retrieved and transmitted (162) by transmitting means 16 and control is returned to the main program (164,166).

The software in the central control unit repetitively obtains address words and sequentially transmits them to the response units and continues to recycle through all of the address words irrespective of the validity of the data words returned from the response units. As valid data words are received, they are transmitted according to a standard protocol to a separate computer 26. Each response unit switches to an "on" mode when a user makes a selection and transmits a data word corresponding to the user selection when the unique address word of the particular response unit is received. If the central unit receives a valid data word (bits 1–8) it immediately sends out an acknowledge message on the next bit (bit 9). The acknowledge message causes the particular response unit to switch to a powered-down mode. This scheme is extremely efficient and significantly simplifies the programming of the central control unit. Because acknowledge messages are sent out as soon as a valid data word is received, the central unit does not need to retain in memory the identity of those response units that have validly responded. Rather, the central control unit merely continues to transmit address words and acknowledge bits and sends valid data words received from response units, as serial response data in standard format, such as RS232, to a computer. Receiving computer 26 may be programmed in high-level language using off-the-shelf software, which may be accomplished by a relatively unskilled programmer.

Each bit segment received from the responding unit is checked and determined to be a valid segment before it is accepted. Furthermore, each user selection from keypad 58, which is illustrated as a four-bit word, is transmitted as an eight-bit data word to the central control unit, including the bits of the selected character and the complement of the bits of the selected character. Thus, redundant data is sent from the response units to the central unit, which provides additional security to prevent the central control unit from receiving an invalid data word.

By utilizing the address word signal to generate a clock within the remote units, which is utilized to control the timing of the transmission of the data words back to the central control unit, an extremely fast, efficient and reliable communication scheme is established. The rate of operation is further increased by providing for one response unit to be transmitting its data word to the central control unit simultaneously with the central control unit transmitting the address word for the next response unit.

Although the invention has been illustrated in a wireless remote response system, it may find application in other remote response systems, including hard-wired systems. Other changes and modifications to the specifically described embodiments can be carded out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A remote response system comprising:

a central control unit including address word transmitting means for sequentially transmitting a plurality of distinct address words and data word receiving means for receiving data words;

a plurality of response units located remote from said central control unit, each of said response units including data entry means for receiving an inputted data word, address word receiving means for receiving said address words transmitted from said central control unit, circuit means responsive to said address word receiving means for identifying a particular one of said address words that have been assigned to that particular one of said response units and data word transmitting means responsive to said data entry means and said circuit means for transmitting a data word from said data entry means to said central control unit in response to identification of a particular address word assigned to that particular remote unit; and said central control unit further including acknowledging means for examining data words received by said data word receiving means and identifying that a data word received from one of said response units is valid and for transmitting an acknowledge message to the one of said response units sending the valid data word.

2. The response system in claim 1 in which said data word transmitting means includes a data word transmitter and energizing means for energizing said data word transmitter, said energizing means being actuated in response to the occurrence of both the receipt of a data word by said data entry means and the identification of the one of said address words assigned to that particular one of said response units, said energizing means being deactuated in response to an acknowledge message being transmitted by said acknowledging means.

3. The response system in claim 2 in which said energizing means includes a gatable switch means responsive to a gate signal for applying power from a power source to said data word transmitter, a first latch means for connecting said power source to, said gatable switch means in response to the receipt of an inputted data word by said data entry means and a second latch means for supplying a gate signal to said gatable switch means in response to said circuit means identifying the one of said address words assigned to that particular one of said response units and for terminating said supplying of a gate signal in response to said data word transmitter transmitting a data word.

4. The response system in claim 3 in which said first latch means is responsive to an acknowledge message being sent by said central control unit for disconnecting said power source from said gatable switch means.

5. The response system in claim 1 in which said address word transmitting means includes means for broadcasting an RF signal at a first predetermined frequency modulated with said address words and said data word transmitting means includes means for broadcasting an RF signal at a second predetermined frequency different than said first frequency and modulated with a data word and wherein one of said response units transmits a data word simultaneously with said central control unit transmitting the address word for another one of said response units.

6. The response system in claim 1 in which said address word transmitting means includes means for broadcasting a first RF signal at a first predetermined frequency, said first RF signal being modulated with said address words and said data word transmitting means includes means for broadcasting a second RF signal at a second predetermined frequency different than said first frequency, said second RF signal being modulated with a data word and wherein each one said response units transmits said second RF signal simultaneously with said central control unit transmitting said first RF signal modulated with the address word assigned to another one of said response units.

7. The response system of claim 5 in which said circuit means further includes clock generating means responsive to said address receiving means for generating clock pulses synchronized with elements of said address words and wherein said data word transmitting means is responsive to said clock pulses in order to establish a time reference for transmitting elements of said data word.

8. The response system in claim 6 in which said circuit means further includes clock generating means responsive to said address receiving means for generating clock pulses synchronized with elements of said address words and wherein said data word transmitting means is responsive to said clock pulses in order to establish a time reference for transmitting elements of said data word.

9. The response system in claim 1 in which said circuit means further includes clock generating means responsive to said address receiving means for generating clock pulses synchronized with elements of said address words and wherein said data word transmitting means is responsive to said clock pulses in order to establish a time reference for transmitting elements of said data word.

10. The response system in claim 1 in which said address word transmitting means includes memory means for storing a plurality of said address words and retrieving means for retrieving address words from said memory means and transmitting individual ones of said retrieved address words in a sequential manner and wherein said retrieving means repetitively cycles through said address words irrespective of which of said response units have sent valid data words.

11. The response system in claim 1 in which said data word transmitting means includes means for frequency modulating an RF signal with said data word and said acknowledging means includes means for sampling said RF signal received by said data word receiving means for a predetermined sampling period and for determining that said RF signal is within one of two predetermined frequency ranges during said sampling period.

12. The response system in claim 11 in which said data word transmitting means includes means for transmitting a data word as a character and a complement of said character and in which said acknowledging means includes means for determining that a character and its complement are in a data word received by said data word receiving means.

13. A remote response system comprising: a central control unit and a plurality of response units located remote from said control unit, said central control unit including address word transmitting means for transmitting a plurality of distinct address words at a given rate and data word receiving means for receiving data words transmitted from said response units;

each or said response units including; address word receiver means tar receiving said elements of address words from said central control unit at said given rate;

address identification means responsive to said address word receiver means for identifying an address word assigned to the particular response unit;

clock generating means responsive to said address word receiver means for generating a clock signal having elements that are generated in synchronism with elements of each of said address words:

data entry means adapted to actuation by a user for receiving and storing data words;

data transmitting means for transmitting data words from said data entry means to the central control unit; and transfer means responsive to said clock signal and to said address identification means for transferring data words from said data entry means to said data transmitting means when said address word assigned to the particular response unit is identified and at a rate that is synchronized with the rate of receipt or said address word elements whereby the rate of data word transmission is established by the central control unit at said given rate.

14. The response system in claim 13 in which each of said response units further includes acknowledge message identification means responsive to said address word receiver means for identifying a particular element of an address word, wherein said particular element is an acknowledge message, each said response unit further including energizing means for energizing said data transmitting means to transmit a data word to said central control unit, said energizing means including first and second latches and means responsive to both said latches being set for energizing said transmitting means, said first latch being set in response to said address identification means identifying said address word that is assigned to the particular response unit, said second latch being set in response to actuation of said data entry means by a user, and wherein both said first and second latches are reset in response to said acknowledge message identification means identifying an acknowledge message, whereby data words are transmitted during the receipt of the address word immediately after the address word that is unique to the particular response unit and will be repeated in this manner until an acknowledge message is received.

15. The response system in claim 14 in which each of said response units includes indicating means for producing an indication to a user, and a third latch for actuating said indicating means, said third latch being set in response to said second latch being set and being reset in response to said address identification means identifying said address word assigned to the particular response unit.

16. A method of retrieving data words at a central control unit from a plurality of remote response units comprising the steps of:

receiving user inputted data words in at least one of said remote response units;

placing each one of said remote response units having a data word obtained during said step or receiving in a first mode indicative of that particular response unit having a data word to be retrieved;

transmitting from said central control unit to substantially all remote response units, distinct address words in a sequential manner, said address words having a predetermined number of elements;

at each one of said remote response units, receiving said address words and identifying when an address word is received that is assigned to that particular remote response unit:

transmitting from each response unit which is in said first mode a data word during an interval after receipt of the address word assigned to the response unit;

receiving at said central control unit each said data word transmitted by one of said response units and determining if each received data word is a valid data word:

transmitting from said central control unit an acknowledge message in response to determining that a valid data word has been received from one of said response units, to the response unit sending the valid data word; and placing a response unit that is in said tint mode in a second mode in response to that response unit receiving an acknowledge message transmitted by said central control unit, said second mode being indicative of that response unit not having a data word to be retrieved.

17. The method in claim 16 in which said step of transmitting an acknowledge message includes transmitting an acknowledge element after determining that a valid data word has been received and during said interval after receipt of the address word assigned to that particular response unit.

18. The method in claim 17 in which said step of transmitting an acknowledge message further includes simultaneously transmitting said acknowledge element to all response units and in which said step of placing a response unit in a second mode includes causing the response unit that transmitted a data word in the interval during which the acknowledge element is being transmitted to respond to the acknowledge element by switching from said tint mode to said second mode.

19. The method in claim 18 in which said step of transmitting from said central control unit includes broadcasting a first RF signal at a first predetermined frequency and said step of transmitting from each response unit includes broadcasting a second RF signal at a second predetermined frequency different from said first RF signal and wherein said first and second RF signals are broadcast concurrently.

20. The method in claim 16 in which said step of transmitting address words includes providing distinct address words, each being assigned to a different one of said response units, and repetitively cycling through all said address words irrespective of the result of said step of determining if a valid data word is received.

21. The method in claim 16 in which said step of transmitting from each response unit includes deriving a clock signal from the elements of the address word being transmitted from the central control unit during said step of transmitting from said central control unit and using said clock signal to provide a time reference for controlling the rate at which said data word is being transmitted.

22. The method in claim 16 in which said step of transmitting from each response unit includes transmitting said data word and a complement of said data word and in which said step of determining includes determining if both a data word and its complement have been received.

23. A remote response system comprising:

a central control unit including means for transmitting a plurality of distinct address words individually in a sequential manner, receiving means for receiving data words, determining means responsive to said receiving means for determining whether a received data word is valid and acknowledging means responsive to a valid data word being received for transmitting an acknowledge message;

a plurality of response units located remote from said central control unit, each of said response units including:

data entry means for receiving input data:

means responsive to said data entry means receiving data for placing said response unit in a first mode indicative of that particular response unit having received data to be transmitted to said central control unit;

receiving means for receiving said address words transmitted from said central control unit and determining if an address word is a predetermined address word assigned to that particular response unit;

data word transmitting means responsive to said receiving means receiving the address word assigned to that particular response unit and to that particular response unit being in said first mode for transmitting a data word representative of said data to said central control unit; and means responsive to said acknowledge message for switching said response unit from said first mode to a second mode indicative of that particular response unit not having data to be transmitted to said central control unit.

24. The response system in claim 23 in which said acknowledging means transmits said acknowledge message substantially concurrently to all said response units and in which said means responsive to said acknowledge message includes means responsive to that particular response unit being the most recent response unit to have transmitted a data word and thereby the one that sent the data word determined by said determining means to be valid for switching that particular response unit from said first mode to said second mode.

25. The response system in claim 24 in which said central control unit transmitting means includes means for broadcasting a first RF signal at a first predetermined frequency and said response unit transmitting means includes means for broadcasting a second RF signal at a second predetermined frequency different from said first frequency wherein said first and second RF signals are broadcast concurrently.

26. The response system in claim 23 in which said central control unit transmitting means includes means for repetitively cycling sequentially through all the distinct address words assigned to response units irrespective of said determining means.

27. The response system in claim 23 in which each said remote unit further includes means responsive to said receiving means for deriving a clock signal from address words and said response unit transmitting means is responsive to said clock signal for transmitting a data word, synchronously with said central control unit transmitting an address word.

28. A remote response system comprising:

a central control unit including control unit transmitting means for individually transmitting a plurality of distinct address words in a sequential manner and control unit receiving means for receiving data words, said control unit transmitting means including means for serially transmitting elements of said address words;

a plurality of response units located remote from said central control unit, each of said response units including data entry means for receiving and storing input data, response unit receiving means for receiving said address words and determining if an address word is a predetermined address word assigned to that particular response unit and transmitting means responsive to said receiving means receiving the address word assigned to that particular response unit for transmitting a data word representative of data stored in said data entry means said data word made up of data word elements;

each of said response units further including clock generating means responsive to said response unit receiving means for generating a clock signal synchronized with said elements of said address words transmitted by said control unit transmitting means and transfer means responsive to said clock signal for serially transferring said data word elements from said data entry means to said response unit transmitting means such that each response unit transmitting means transmits said data word elements synchronized with the elements of address words being transmitted by said central control unit during the interval immediately after the address word assigned to that particular response unit is transmitted by said central control unit.

29. The response system in claim 28 in which said central control unit transmitting means includes means for broadcasting a first RF signal at a first predetermined frequency and said response unit transmitting means includes means for broadcasting a second RF signal at a second predetermined frequency different from said first frequency wherein said first and second RF signals are broadcast concurrently.

30. The response system in claim 28 in which said central control unit further includes determining means responsive to said control unit receiving means for determining whether said data words are valid and acknowledging means responsive to said determining means for causing said control unit transmitting means to transmit an acknowledge message in response to a valid data word.

31. The response system in claim 30 in which said address words and said data words have the same number of elements and in which said acknowledge message is transmitted by said control unit transmitting means as an additional element of the address word being transmitted concurrently with a data word that is determined by said control unit determining means to be valid.

32. The response system in claim 30 in which said response unit transmitting means includes means for transmitting a data word including said data and a complement of said data and in which said determining means is responsive to receipt of a data word and the complement of said data word for determining that the received data word is valid.

33. The response system in claim 31 in which said elements are equally spaced in time.

34. The response system in claim 32 in which said response unit transmitting means includes means for transmitting an RF signal that is frequency-shift-key modulated by a data word and in which said central control unit determining means includes means for counting cycles of a received data word signal and means responsive to said counting means for determining that the number of said cycles within a predetermined period is within one of two predetermined ranges.

35. A method of retrieving data at a central control unit from a plurality of remote response units comprising the steps of:

transmitting from said central control unit to said plurality of remote response units a plurality of distinct address words individually in a sequential manner;

receiving at each remote response unit said address words transmitted from said central control unit and identifying an address word that is assigned to that particular remote unit;

transmitting a data word from a remote response unit to said central control unit in response to that particular remote response unit identifying the address word assigned to it;

receiving at said central control unit data words transmitted from said remote response units and determining whether said data words are valid; and transmitting an acknowledge message from the central control unit to the remote response unit sending the valid data word in response to said central control unit receiving a valid data word.

36. The method in claim 35 in which said step of transmitting a data word occurs substantially concurrently with the transmitting from the central control unit of the address word sequentially transmitted immediately after said address word that is assigned to the remote unit that is transmitting data.

37. The method in claim 36 in which said step of transmitting an acknowledge message occurs after transmitting from the-central control unit said next address word and before transmitting from the central control unit the address word that is sequentially transmitted immediately after said next address word.

38. A method of retrieving data at a central control unit from a plurality of remotely positioned response units comprising the steps of:

sequentially transmitting a plurality of distinct address words having elements from said central control unit in a manner that elements of each address word are serially transmitted;

receiving at each of said response units said plurality of distinct address words transmitted from said central control unit;

generating at each of said response units, from the received data words, a clock signal synchronized with said elements of said address words;

receiving user selections at each of said response units and storing each selection as a data word having elements;

serially transmitting said elements of said data word to the central control unit from a response unit upon the central control unit transmitting an address word assigned to that particular response unit and at a rate determined by said clock signal.

39. The method in claim 38 in which said step of sequentially transmitting includes broadcasting a first RF signal at a first predetermined frequency modulated with said address word elements and said step of transmitting said data word includes broadcasting a second RF signal at a second predetermined frequency modulated with said data word and in which said second frequency is different from said first frequency whereby said first and second RF signal are broadcast concurrently.

*40. A remote response system comprising:*

*a central control unit including address word transmitting means for transmitting address words and data word receiving means for receiving data words;*

*a plurality of response units located remote from said central control unit, each of said response units including data entry means for receiving an inputted data word, address word receiving means for receiving said address words transmitted from said central control unit, circuit means responsive to said address word receiving means for identifying a particular one of said address words that have been assigned to that particular one of said response units and data word transmitting means responsive to said data entry means and said circuit means for transmitting a data word from said data entry means to said central control unit in response to identification of a particular address word assigned to that particular remote unit; and*

*said central control unit further including acknowledging means for examining data words received by said data word receiving means and identifying that a data word received from one of said response units is valid and for transmitting an acknowledge message to the one of said response units sending the valid data word.*

*41. A method of retrieving data words at a central control unit from a plurality of remote response units comprising the steps of:*

*receiving user inputted data words in at least one of said remote response units;*

*placing each one of said remote response units having a data word obtained during said step of receiving in a first mode indicative of that particular response unit having a data word to be retrieved;*

*transmitting address words from said central control unit to substantially all remote response units;*

*at each one of said remote response units, receiving said address words and identifying when an address word is received that is assigned to that particular remote response unit;*

*transmitting from each response unit which is in said first mode a data word during an interval after receipt of the address word assigned to the response unit;*

*receiving at said central control unit each said data word transmitted by one of said response units and determining if each received data word is a valid data word;*

*transmitting from said central control unit an acknowledge message in response to determining that a valid data word has been received from one of said response units, to the response unit sending the valid data word; and*

*placing a response unit that is in said first mode in a second mode in response to that response unit receiving an acknowledge message transmitted by said central control unit, said second mode being indicative of that response unit not having a data word to be retrieved.*

*42. A remote response system comprising:*

*a central control unit including means for transmitting address words, receiving means for receiving data words, determining means responsive to said receiving means for determining whether a received data word is valid and acknowledging means responsive to a valid data word being received for transmitting an acknowledge message;*

*a plurality of response units located remote from said central control unit, each of said response units including;*

*data entry means for receiving input data;*

*means responsive to said data entry means receiving data for placing said response unit in a first mode indicative of that particular response unit having received data to be transmitted to said central control unit;*

*receiving means for receiving said address words transmitted from said central control unit and determining if an address word is assigned to that particular response unit;*

*data word transmitting means responsive to said receiving means receiving the address word assigned to that particular response unit and to that particular response unit being in said first mode for transmitting a data word representative of said data to said central control unit; and*

*means responsive to said acknowledge message for switching said response unit from said first mode to a second mode indicative of that particular response unit not having data to be transmitted to said central control unit.*

*43. A method of retrieving data at a central control unit from a plurality of remote response units comprising the steps of:*

*transmitting address words from said central control unit to said plurality of remote response units;*

*receiving at each remote response unit said address words transmitted from said central control unit and identifying an address word that is assigned to that particular remote unit;*

*transmitting a data word from a remote response unit to said central control unit in response to that particular remote unit identifying the address word assigned to it;*

*receiving at said central control unit data words transmitted from said remote response units and determining whether said data words are valid; and*

*transmitting an acknowledge message from the central control unit to the remote response unit sending the valid data word in response to said central control unit receiving a valid data word.*

* * * * *

US00RE35449C1

(12) EX PARTE REEXAMINATION CERTIFICATE (8230th)

United States Patent

Derks

(10) Number: US RE35,449 C1

(45) Certificate Issued: May 17, 2011

(54) REMOTE 3-WAY TRANSMISSION AUDIENCE POLLING AND RESPONSE SYSTEM

(75) Inventor: Harry G. Derks, Holland, MI (US)

(73) Assignee: Fleetwood Furniture Company, Holland, MI (US)

Reexamination Request:
No. 90/008,539, Mar. 20, 2007

Reexamination Certificate for:

| | |
|---|---|
| Patent No.: | **Re. 35,449** |
| Issued: | **Feb. 11, 1997** |
| Appl. No.: | **08/204,653** |
| Filed: | **Mar. 2, 1994** |

Related U.S. Patent Documents

Reissue of:

| | |
|---|---|
| (64) Patent No.: | **5,093,786** |
| Issued: | **Mar. 3, 1992** |
| Appl. No.: | **07/303,163** |
| Filed: | **Jan. 27, 1989** |

(51) Int. Cl.
*G06F 15/16* (2006.01)
*H02J 13/00* (2006.01)

(52) U.S. Cl. ..... 709/227; 340/825.52

(58) Field of Classification Search ..... None
See application file for complete search history.

(56) References Cited

U.S. PATENT DOCUMENTS

| | | | | |
|---|---|---|---|---|
| 3,314,172 | A | | 4/1967 | Boyett |
| 3,445,815 | A | | 5/1969 | Saltzberg et al. |
| 3,500,559 | A | | 3/1970 | Jones et al. |
| 3,579,864 | A | | 5/1971 | Littwin et al. |
| 3,631,612 | A | | 1/1972 | Westerberg |
| 3,766,523 | A | * | 10/1973 | Brocker et al. ..... 340/825.75 |
| 3,803,491 | A | | 4/1974 | Osborn |
| 4,238,893 | A | * | 12/1980 | Komatsubara et al. ..... 434/351 |
| 4,247,908 | A | * | 1/1981 | Lockhart et al. ..... 709/245 |
| 4,251,865 | A | * | 2/1981 | Moore et al. ..... 710/109 |
| 4,354,252 | A | | 10/1982 | Lamb et al. |

(Continued)

FOREIGN PATENT DOCUMENTS

| | | |
|---|---|---|
| GB | 1078296 | 8/1967 |
| GB | 1523753 | 9/1978 |

OTHER PUBLICATIONS

YourDictionary.com definition for block check character telecom definition, retrieved from google.com search May 12, 2009.*

Javvin network management & security, Tele–Communication (Telecom) Terms Glossary and Dictionary, BCC: Block Check Character definition; retrieved from google.com search May 12, 2009.*

Conard, James W., "Character–Oriented Data Link Control Products," IEEE Transactions on Communications, vol. COM–28, No. 4, Apr. 1980, pp. 445–454.

Tobagi, Fouad A., Multiaccess Protocols in Packet Communication Systems, IEEE Transactions on Communications, vol. COM–28, No. 4, Apr. 1980, pp. 468–488.

*Primary Examiner*—M. Steelman

(57) ABSTRACT

A remote response system includes a central control unit and a plurality of remotely-located response units each having keypads for entering a selection from a user. The central control unit sequentially transmits distinct address words and includes redundant receivers for receiving data words transmitted by response units. Each response unit becomes powered-up upon the entry of a user response and transmits a data word, corresponding to the user selection, upon receipt of its unique address word. The central control unit examines the validity of each data bit received and the validity of an entire data word to determine if both a character and its complement are received. If a valid data word is received, the central control unit transmits an acknowledge bit, which powers-down the response unit that sent the valid word. Each response unit transmits its data word simultaneously with the central control unit transmitting the address word for the next unit that is to respond with the transmissions occurring over distinct frequency channels. A clock signal for controlling data word serial bit transmissions is derived at each response unit from the address word signal.

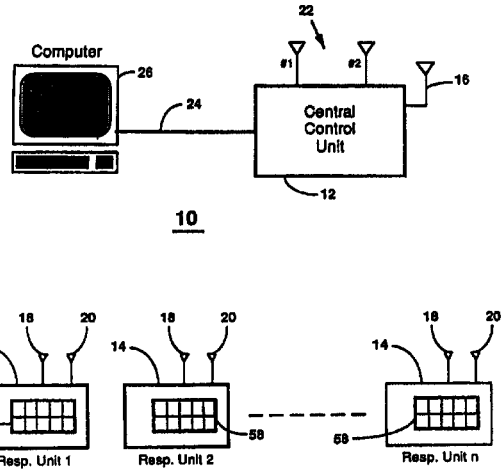

U.S. PATENT DOCUMENTS

| | | | |
|---|---|---|---|
| 4,415,065 | A | 11/1983 | Sandstedt |
| 4,477,809 | A | 10/1984 | Bose |
| 4,574,284 | A | 3/1986 | Feldman et al. |
| 4,654,818 | A | 3/1987 | Wetterau, Jr. |
| 4,663,499 | A | 5/1987 | Duval |
| 4,682,958 | A | 7/1987 | Slavik et al. |
| 4,691,202 | A | 9/1987 | Denne et al. |
| 4,817,115 | A | 3/1989 | Campo et al. |
| 4,820,167 | A | 4/1989 | Nobles et al. |
| 4,877,408 | A | 10/1989 | Hartsfield |
| 5,002,491 | A | 3/1991 | Abrahamson et al. |

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4, 9-10, 13, 16, 21, 23, 26-28, 30, 35, 38 and 40-43 are cancelled.

Claims 5-8, 11, 12, 14, 15, 17-20, 22, 24, 25, 29, 31-34, 36, 37 and 39 were not reexamined.

* * * * *